(12) United States Patent
Horng

(10) Patent No.: US 9,274,566 B1
(45) Date of Patent: Mar. 1, 2016

(54) DUAL-SHAFT HINGE FOR FLIP-UP ELECTRONIC PRODUCT

(71) Applicant: YUAN DENG METALS INDUSTRIAL CO., LTD., Taoyuan (TW)

(72) Inventor: Chin-Hsing Horng, Taoyuan (TW)

(73) Assignee: YUAN DENG METALS INDUSTRIAL CO., LTD., Taoyuan (TW)

( * ) Notice: Subject to any disclaimer, the term of this patent is extended or adjusted under 35 U.S.C. 154(b) by 0 days.

(21) Appl. No.: 14/712,075

(22) Filed: May 14, 2015

(51) Int. Cl.
*G06F 1/16* (2006.01)
*E05D 3/12* (2006.01)
*E05D 5/10* (2006.01)
*E05D 5/14* (2006.01)

(52) U.S. Cl.
CPC ............... *G06F 1/1681* (2013.01); *E05D 3/12* (2013.01); *E05D 5/10* (2013.01); *E05D 5/14* (2013.01); *E05D 2005/106* (2013.01); *Y10T 16/547* (2015.01)

(58) Field of Classification Search
CPC . Y10T 16/547; Y10T 16/5474; Y10T 16/557; Y10T 16/5403; Y10T 16/5409; Y10T 16/54095; E05D 3/12; E05D 3/06; E05D 5/10; E05D 5/14; E05D 2005/106; E05Y 2900/606; H04M 1/022; H04M 1/0216; G06F 1/1618; G06F 1/1681
USPC ................... 16/366, 368, 386, 337, 352, 353; 361/679.27; 455/575.3; 379/433.13
See application file for complete search history.

(56) References Cited

U.S. PATENT DOCUMENTS

| 8,918,960 | B2* | 12/2014 | Hsu | H04M 1/0216 16/303 |
|---|---|---|---|---|
| 8,989,720 | B2* | 3/2015 | Dunko | H04M 3/42068 379/158 |
| 9,003,607 | B1* | 4/2015 | Hsu | F16H 21/44 16/366 |
| 9,057,215 | B1* | 6/2015 | Horng | E05D 3/06 |
| 2014/0352113 | A1* | 12/2014 | Chen | H04M 1/022 16/366 |
| 2015/0040353 | A1* | 2/2015 | Chen | G06F 1/1681 16/366 |
| 2015/0160695 | A1* | 6/2015 | Su | G06F 1/1618 16/366 |
| 2015/0173218 | A1* | 6/2015 | Hsu | E05D 3/12 16/366 |
| 2015/0189777 | A1* | 7/2015 | Hsu | H05K 5/0226 16/366 |

FOREIGN PATENT DOCUMENTS

CN       203655884 U  *  6/2014

* cited by examiner

*Primary Examiner* — William Miller

(57) ABSTRACT

A dual-shaft hinge connected between a cover member and a base member of a flip-up electronic product is disclosed to include a hinge shaft set including a first hinge shaft having a spirally extended propelling groove, a second hinge shaft having a spirally extended position-limit groove, a female hinge member coupled to the first hinge shaft and the second hinge shaft, a sliding block set having a first protrusion and a second protrusion respectively located at two opposite sides thereof and respectively coupled to the propelling groove and the position-limit groove, and a linkage adapted to limit the rotating angle of the first hinge shaft and the turning angle of the female hinge member about the second hinge shaft, preventing errors in angular difference between the two opposite lateral sides of the cover member and the two opposite lateral sides of the base member.

4 Claims, 11 Drawing Sheets

DUAL-SHAFT HINGE FOR FLIP-UP ELECTRONIC PRODUCT

BACKGROUND OF THE INVENTION

1. Field of the Invention

The present invention relates to flip-up electronic product technology and more particularly, to a dual-shaft hinge for connection between a base member and a cover member of a flip-up electronic product, which enables the base member and the cover member to be biased relative to each other smoothly and accurately, preventing errors in angular difference between the two opposite lateral sides of the cover member and the two opposite lateral sides of the base member.

2. Description of the Related Art

Hinges are intensively used in flip-up mobile electronic devices, such as notebook, electronic dictionary, PDA and etc. to pivotally connect a base member and a cover member together, allowing only a limited angle of rotation between them. These hinges are commonly of a dual-shaft design. A conventional dual-shaft hinge for flip-up electronic product generally comprises a female hinge member, and two hinge shafts pivotally coupled to the female hinge member and respectively affixed to a base member and a cover member of a flip-up electronic product, and thus, the cover member of the flip-up electronic product can be opened and attached to the bottom side of the base member between, or closed and attached to the top side of the base member.

In commercial dual-shaft hinges, biasing between the first hinge shaft and the female hinge member can be achieved through screw transmission or linkage transmission. In a screw transmission type dual-shaft hinge, the first hinge shaft and the second hinge shaft are respectively configured to provide a spirally extended guide groove, and a sliding block is coupled between the spirally extended guide groove of the first hinge shaft and the spirally extended guide groove of the second hinge shaft. In a linkage transmsission type dual-shaft hinge, a linkage is coupled between one side of the first hinge shaft and one side of the second hinge shaft. However, either screw transmission type or linkage transmission type, conventional dual-shaft hinges commonly ignore an important issue, that is, two dual-shaft hinges are normally used and bilaterally connected between the cover member and base member of the flip-up electronic product, and no linking means is provided to link the two dual-shaft hinges; when the user biases the cover member relative to the base member, the two dual-shaft hinges can receive different pressures due to insufficient rigidity of the cover member. During the application of a screw transmission type dual-shaft hinge, if the applied force is not evernly distributed through the two dual-shaft hinges, errors in angular difference between the two opposite lateral sides of the cover member and the two opposite lateral sides of the base member can occur, and the user can see the occurrence of this problem. Further, because the first hinge shaft, the second hinge shaft and the sliding block are moved at the same time, the user will be unable to bias the cover member smoothly when the aforesaid errors occurred. If the user keeps biasing the cover member with more effort, a high friction between component parts will occur, shortening the lifespan of the product.

SUMMARY OF THE INVENTION

Embodiments of the present invention have been accomplished under the circumstances in view. It is therefore an object of embodiments of the present invention to provide a dual-shaft hinge, which uses a spiral guide method to let rotation of the first hinge shaft and turning of the second hinge shaft about the female hinge member be interacted, thereby limiting the rotating angle of the first hinge shaft and the turning angle of the second hinge shaft about the female hinge member, smoothing hinge operation, preventing excessive hinge wear that shortens the hinge lifespan, controlling angular error between the first hinge shafts of the two dual-shaft hinges that are bilaterally connected between the base member and cover member of the flip-up electronic product. Thus, the opposing front and rear edges of the cover member of the flip-up electronic product can be held in vertical alignment with the respective opposing front and rear edges of the base member.

It is another object of embodiments of the present invention to provide a dual-shaft hinge, which uses a linkage to limit the rotating angle of the first hinge shaft and the turning angle of the second hinge shaft about the female hinge member, prolonging hinge lifespan and preventing a significant angular error between the opposing front and rear edges of the cover member of the flip-up electronic product and the respective opposing front and rear edges of the base member.

To achieve this and other objects of embodiments of the present invention, a dual-shaft hinge used in a flip-up electronic product comprises a female hinge member, a hinge shaft set and a sliding block. The hinge shaft set comprises a first hinge shaft and a second hinge shaft. The first hinge shaft comprises a first shaft body pivotally coupled to the female hinge member, a first guide portion located at one end of the first shaft body and disposed outside the female hinge member, and a propelling groove spirally extending around the periphery of a part of the first guide portion. The second hinge shaft comprises a second shaft body pivotally coupled to the female hinge member, a second guide portion located at one end of the second shaft body and disposed outside the female hinge member, and a position-limit groove spirally extending around the periphery of a part of the second guide portion. The second guide portion defines a first peripheral wall and a second peripheral wall respectively disposed at two opposite lateral sides relative to the position-limit groove. The sliding block is disposed between the first guide portion and the second guide portion of the hinge shaft se. Further, the sliding block comprises a block body, a first protrusion located at one side thereof and coupled to the propelling groove of the hinge shaft set, and a second protrusion located at an opposite side thereof and coupled to said position-limit groove of the hinge shaft set. Further, the width of the first peripheral wall and the width of the second peripheral wall are larger than the width of the second protrusion so that when the second protrusion is abutted against the first peripheral wall, a displacement space is created in between the second protrusion and the second peripheral wall, and thus, when a biasing force is applied to the first hinge shaft at this time, the first hinge shaft is rotated and the propelling groove is forced to propel the first protrusion in causing movement of the sliding block toward the second peripheral wall; when the second protrusion is abutted against the second peripheral wall, a position-limit space is created in between the second protrusion and the first peripheral wall, and thus, when a biasing force is applied to the first hinge shaft, the first hinge shaft is prohibited from rotation, and the first hinge shaft is forced to turn the sliding block about the second hinge shaft to further cause the second protrusion to be moved toward the first peripheral wall.

DETAILED DESCRIPTION OF THE PREFERRED EMBODIMENT

Figure 1:
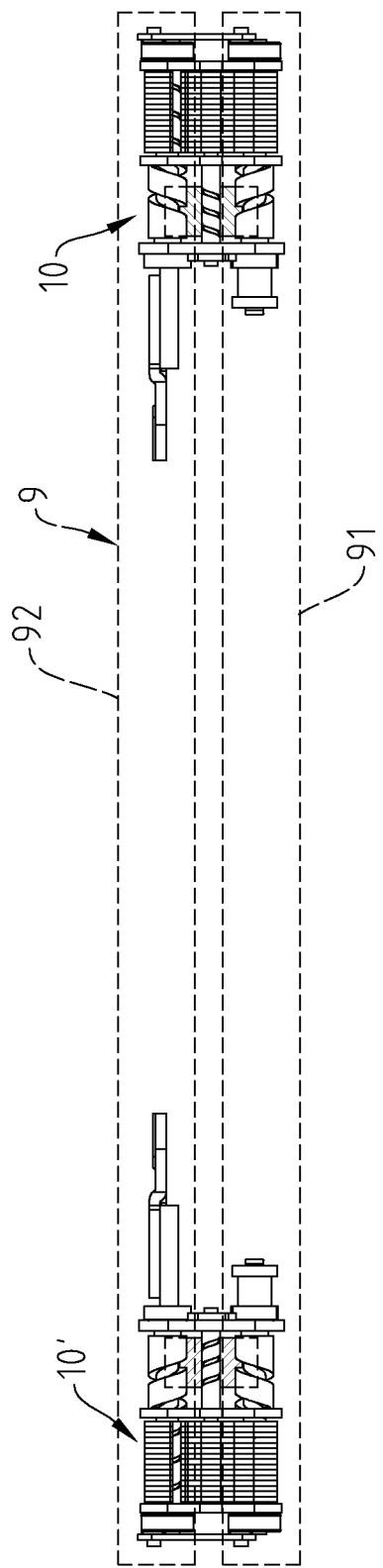
FIG. 1 is a schematic top view illustrating two dual-shaft hinges bilaterally connected between a base member and a cover member of a flip-up electronic product in accordance with the present invention.
Figure 2:
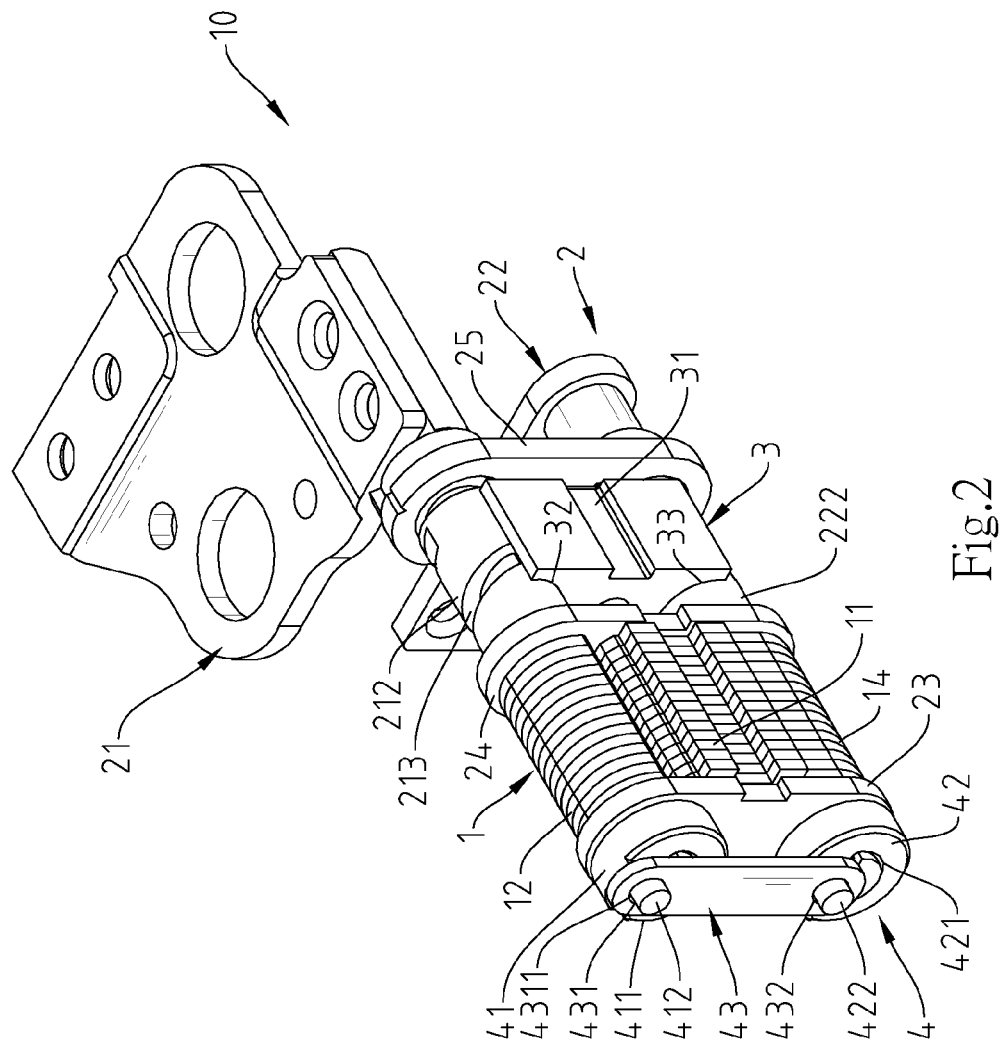
FIG. 2 is an oblique top elevational view of a dual-shaft hinge in accordance with the present invention.
Figure 3:
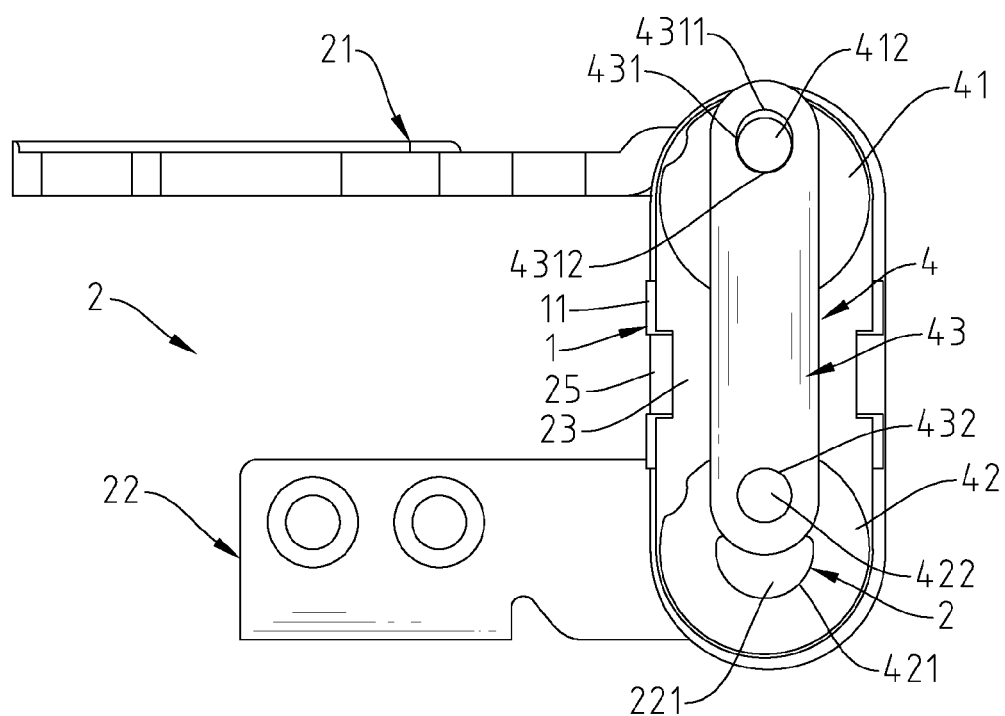
FIG. 3 is a side view of the dual-shaft hinge in accordance with the present invention.
Figure 4:
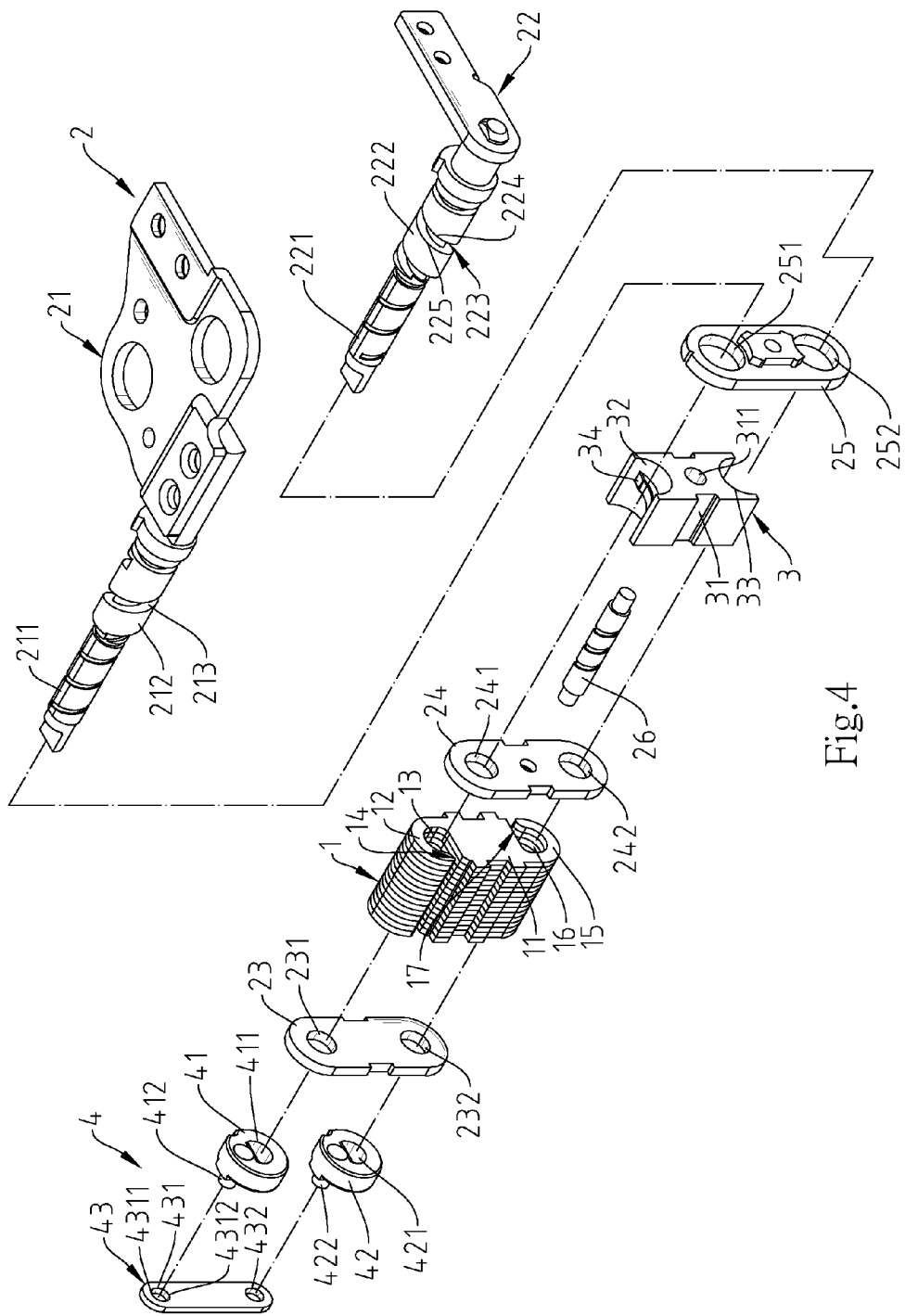
FIG. 4 is an exploded view of the dual-shaft hinge in accordance with the present invention.
Figure 5:
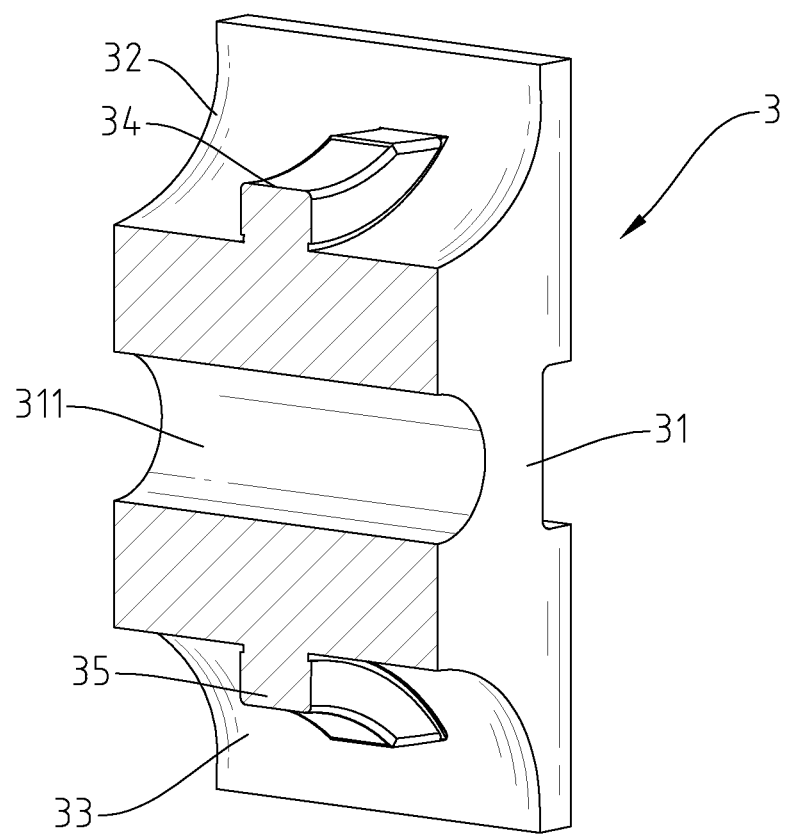
FIG. 5 is a sectional elevation, in an enlarged scale, of the sliding block of the dual-shaft hinge in accordance with the present invention.
Figure 6:
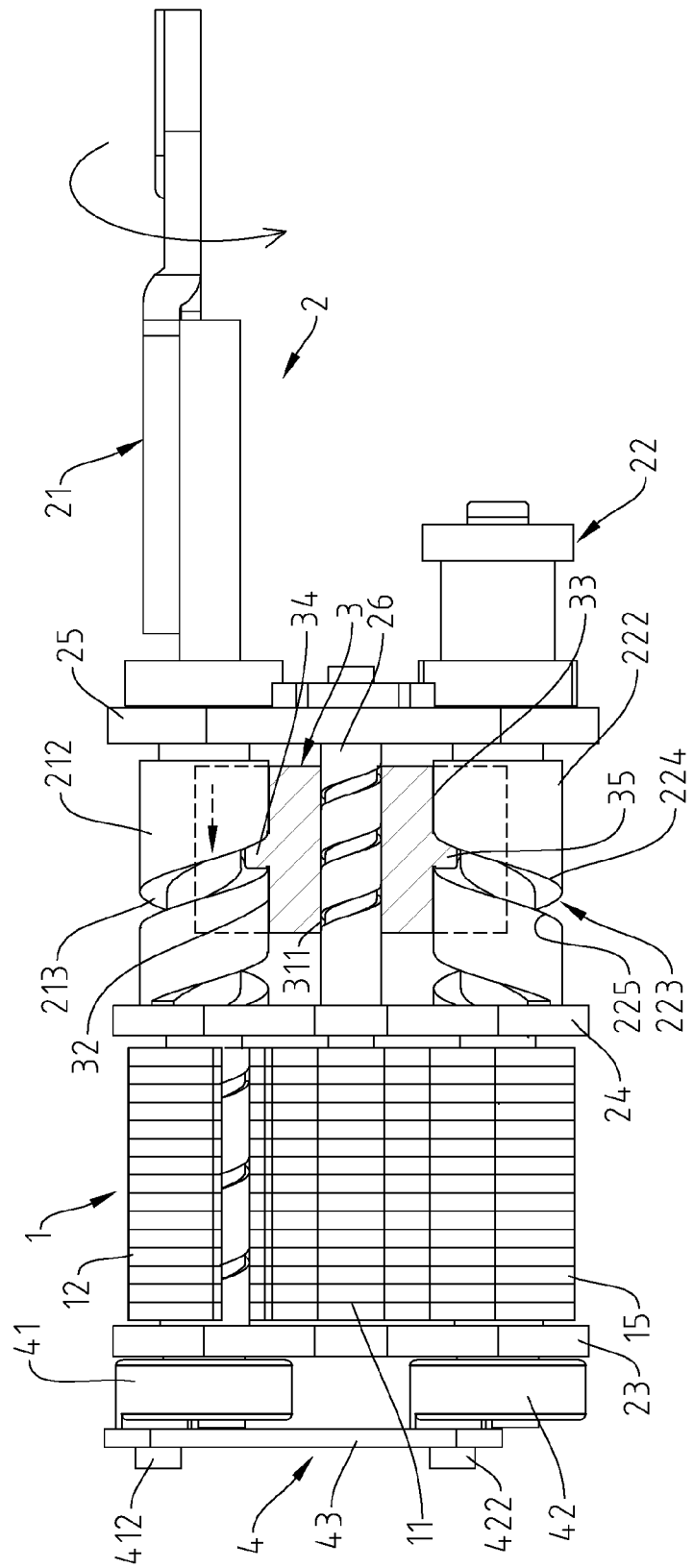
FIG. 6 is a schematic view illustrating an operating status of the dual-shaft hinge in accordance with the present invention.

Referring to FIGS. 1 and 5, two dual-shaft hinges 10; 10' are bilaterally connected between a base member 91 and a cover member 92 of a flip-up electronic product 9. Each dual-shaft hinge 10; 10' comprises a female hinge member 1, hinge shaft set 2, sliding block 3 and a linkage 4.

The female hinge member 1 comprises a base portion 11, a first bearing portion 12 upwardly extended from one lateral side, namely, the right lateral side of the base portion 11 and smoohtly curved in direction toward the other lateral side, namely, the left lateral side of the base portion 11, a first shaft space 13 defined between the first bearing portion 12 and the base portion 11, a second bearing portion 15 downwardly extended from an opposite lateral side, namely, the left lateral side of the base portion 11 and smoothly curved in direction toward the right lateral side of the base portion 11, a second shaft space 16 defined between the second bearing portion 15 and the base portion 11, a first gap 14 defined between the distal end of the first bearing portion 12 and the base portion 11, and a second gap 17 defined between the distal end of the second bearing portion 15 and the base portion 11. Further, the first gap 14 and the second gap 17 are respectively disposed in the upper left corner and lower right corner of the base portion 11.

The hinge shaft set 2 comprises a first hinge shaft 21, a second hinge shaft 22, a first locating member 23, a second locating member 24, a third locating member 25 and a locating rod 26. The first hinge shaft 21 comprises a first shaft body 211 pivotally coupled to the first shaft space 13 of the female hinge member 1, a first guide portion 212 located at one end of the first shaft body 211 and exposed to the outside of the female hinge member 1, and a propelling groove 213 spirally extending around a part of the periphery of the first guide portion 212. The second hinge shaft 22 comprises a second shaft body 221 pivotally coupled to the second shaft space 16 of the female hinge member 1, a second guide portion 222 located at one end of the second shaft body 221 and exposed to the outside of the female hinge member 1, and a position-limit groove 223 spirally extending around a part of the periphery of the second guide portion 222 in a direction reversed to the extending direction of the propelling groove 213. Further, the second guide portion 222 defines a first peripheral wall 224 and a second peripheral wall 225 respectively located at two opposite lateral sides relative to the position-limit groove 223. The first locating member 23 and the second locating member 24 are respectively attached to opposing front and rear sides of the female hinge member 1, each comprising a first locating hole 231;241 and a second locating hole 232;242 respectively located near two opposite ends thereof and respectively kept in alignment with the first shaft space 13 and second shaft space 16 of the female hinge member 1 so that the first shaft body 211 of the first hinge shaft 21 can be inserted through the respective first locating holes 231;241 and the second shaft body 221 of the second hinge shaft 22 can be inserted through the respective second locating holes 232;242. The third locating member 25 is kept in alignment with the first locating member 23 and the second locating member 24 and spaced from one side of the the second locating member 24 opposite to the first locating member 23 at a predetermined distance, comprising a first locating hole 251 and a second locating hole 252 respectively located near two opposite ends thereof and respectively kept in alignment with the first shaft space 13 and second shaft space 16 of the female hinge member 1 for the insertion of the first hinge shaft 21 and the second hinge shaft 22 respectively, enabling one end of first guide portion 212 of the first hinge shaft 21 and one end of the second guide portion 222 of the second hinge shaft 22 to be respectively disposed in the first locating hole 251 and second locating hole 252 of the third locating member 25. The locating rod 26 has two opposite ends thereof respectively connected to the second locating member 24 and the third locating member 25.

The sliding block 3 is disposed between the first guide portion 212 and second guide portion 222 of the hinge shaft set 2, comprising a block body 31, a guide hole 311 cut through opposing front and rear sides of the block body 31 for the passing of the locating rod 26 of the hinge shaft set 2, a first position-limit groove 32 and second position-limit groove 33 respectively located at opposing top and bottom walls of the block body 31, a first protrusion 34 located in the first position-limit groove 32 and coupled to the propelling groove 213 of the hinge shaft set 2, and a second protrusion 35 located in the second position-limit groove 33 and coupled to the position-limit groove 223 of the hinge shaft set 2.

The linkage 4 comprises a first rotating member 41, a second rotating member 42, and a position-limit member 43. The first rotating member 41 comprises a first mounting hole 411 located at the center thereof and fixedly connected to the distal end of the first shaft body 211 of the hinge shaft set 2, and a first position-limit rod 412 perpendicularly extended from one side thereof and kept in axial alignment with the first locating hole 231 of the first locating member 23. The second rotating member 42 comprises a second mounting hole 421 located at the center thereof and fixedly connected to the distal end of the second shaft body 221 of the hinge shaft set 2, and a second position-limit rod 422 perpendicularly extended from one side thereof and kept in axial alignment with the second locating hole 232 of the first locating member 23. The position-limit member 43 comprises a first position-limit hole 431 and a second position-limit hole 432 respectively located near two opposite ends thereof and respectively coupled to the first position-limit rod 412 and the second position-limit rod 422, a first stop rib 4311 located in the first position-limit hole 431 and disposed relatively close to the second position-limit hole 432, and a second stop rib 4312 located in the first position-limit hole 431 and disposed relatively far from the second position-limit hole 432. Further, the distance between the first stop rib 4311 and the second stop rib 4312 is larger than the outer diameter of the first position-limit rod 412.

Figure 7:
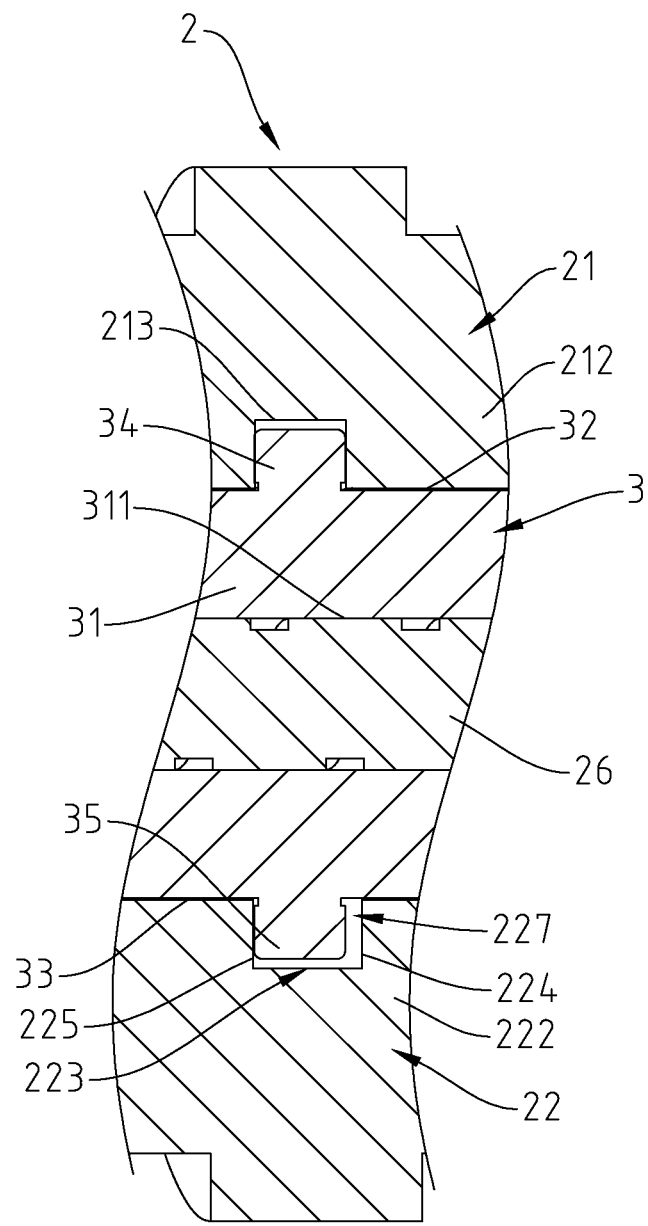
FIG. 7 is a schematic drawing of the present invention, illustrating a relative movement between the hinge shaft set and the sliding block.
Figure 8:
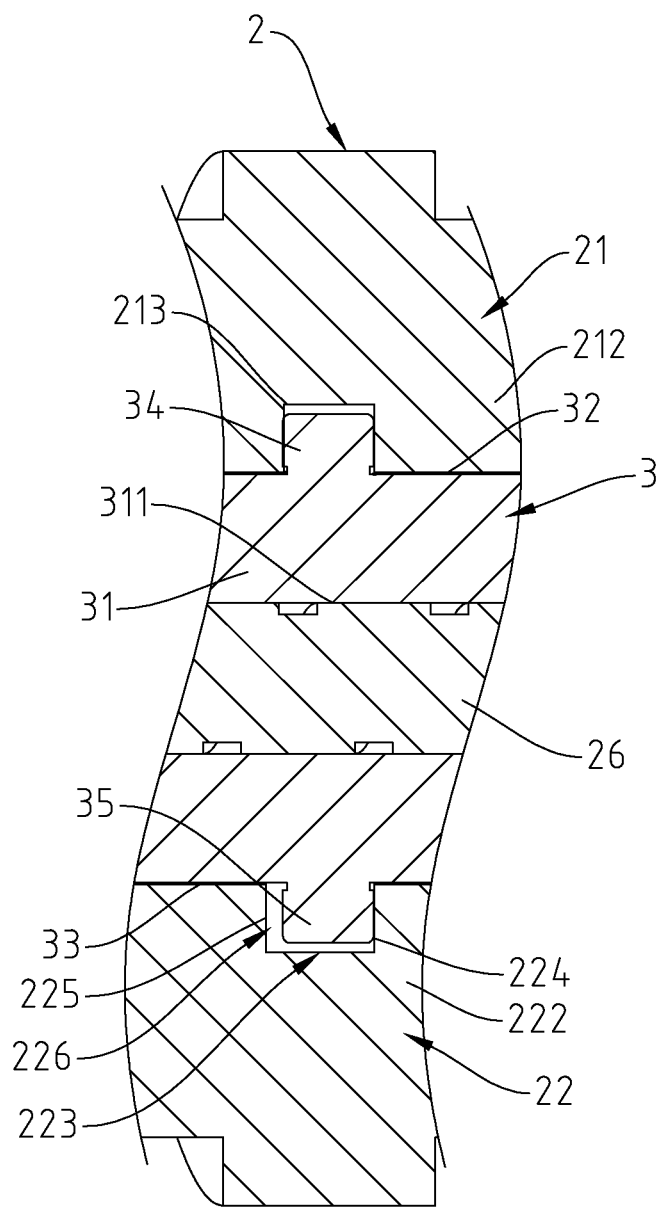
FIG. 8 is a schematic drawing of the present invention, illustrating another relative movement between the hinge shaft set and the sliding block.
Figure 9:
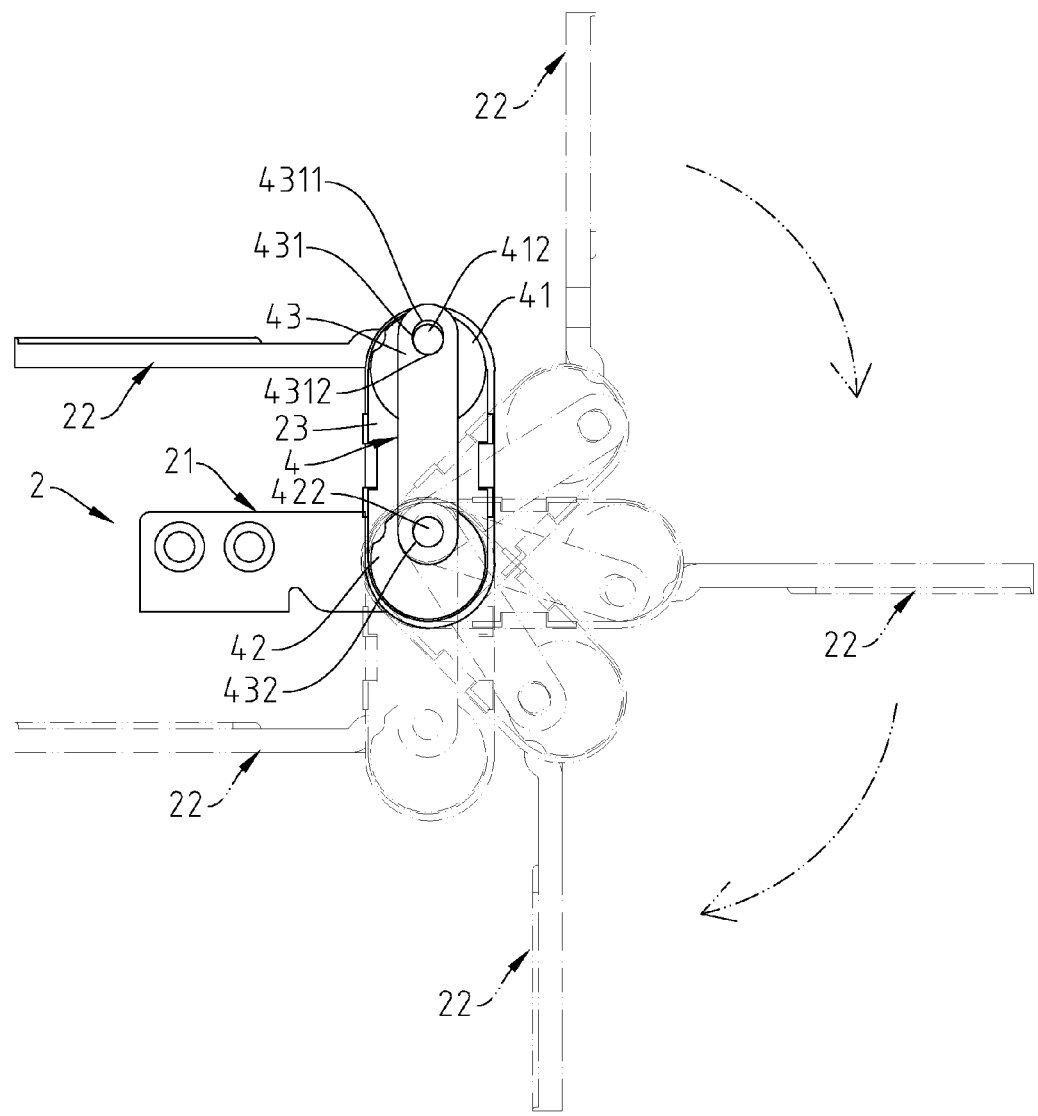
FIG. 9 is a schematic drawing of the present invention, illustrating the second hinge shaft biased relative to the first hinge shaft.
Figure 10:
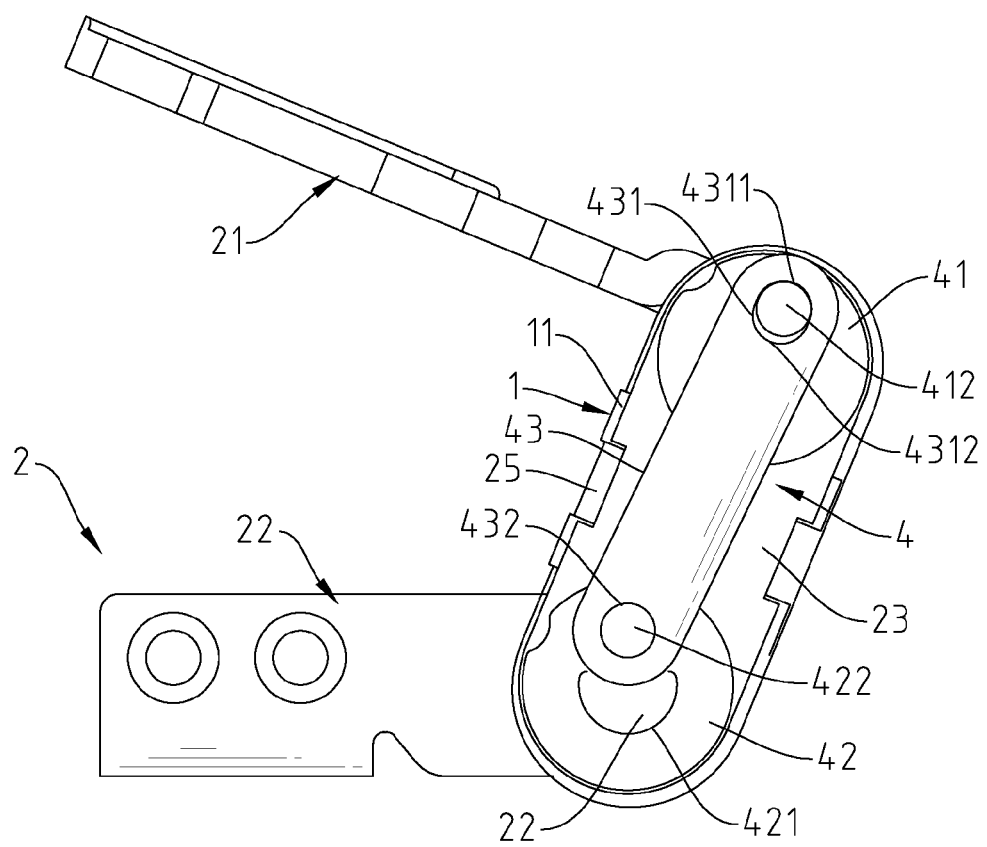
FIG. 10 is a schematic drawing illustrating movement between the hinge shaft set and the linkage during operation of the dual-shaft hinge in accoredance with the present invention (I).
Figure 11:
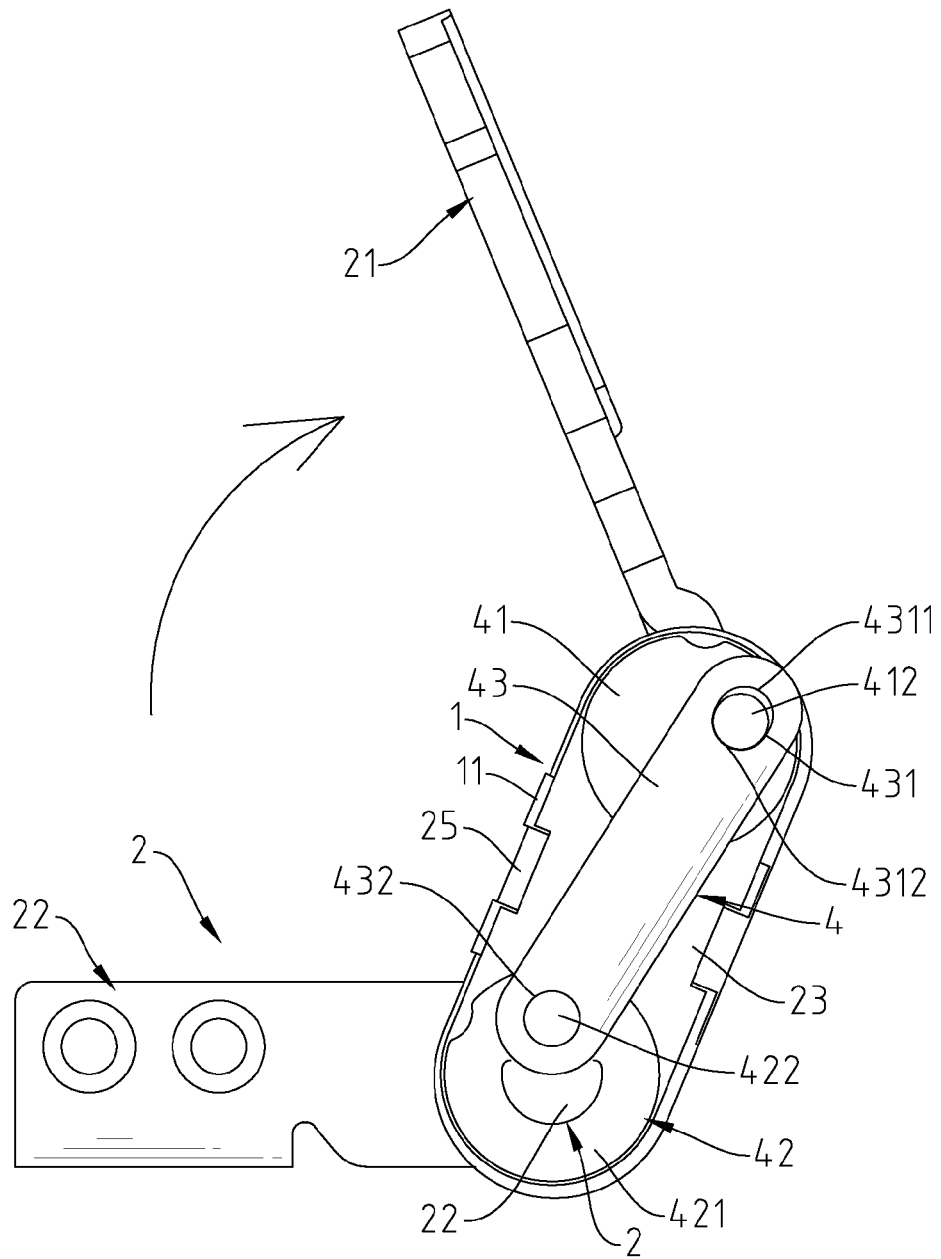
FIG. 11 is a schematic drawing illustrating movement between the hinge shaft set and the linkage during operation of the dual-shaft hinge in accoredance with the present invention (II).

Referring to FIGS. 6-9 and FIG. 1 again, when opening the cover member 92 from the base member 91, the first hinge shaft 21 is biased to turn the female hinge member 1 about the second hinge shaft 2. As illustrated in FIG. 7, when the second protrusion 35 is stopped at the second peripheral wall 225, a position-limit space 227 is created in between the second protrusion 35 and the first peripheral wall 224, the biasing force being applied to the first hinge shaft 21 cannot cause the propelling groove 213 of the first hinge shaft 21 to move the first protrusion 34 due to that the second protrusion 35 is stopped at the second peripheral wall 225, thus, the applied biasing force can simply force the first hinge shaft 21 to turn the sliding block 3 and the female hinge member 1 about the second hinge shaft 22, thereby moving the second protrusion 35 along the position-limit groove 223 toward the first peripheral wall 224. When the second protrusion 35 is forced into abutment against the first peripheral wall 224, a displacement space 226 is created in between the second protrusion 35 and the second peripheral wall 225. At this time, due to that the second protrusion 35 is stopped by the first peripheral wall 224, the first hinge shaft 21 cannot keep turning the sliding block 3 and the female hinge member 1 about the second hinge shaft 22, therefore, the biasing force being applied to the first hinge shaft 21 causes the first hinge shaft 21 to rotate, driving the propelling groove 213 of the first hinge shaft 21 to propel the first protrusion 34, and thus, the sliding block 3 is moved toward the second peripheral wall 225 into abutment against the second peripheral wall 225, resulting in creation of a position-limit space 227 in between the second protrusion 35 and the first peripheral wall 224. Repeating the aforesaid action will alternatively cause the first hinge shaft 21 to rotate and the female hinge member 1 to turn with the sliding block 3 about the second hinge shaft 22, thereby limiting the rotating angle of the first hinge shaft 21 and the biasing angle of the female hinge member 1 and the sliding block 3 about the second hinge shaft 22, and thus, the rotating angle of the first hinge shafts 21 of the two dual-shaft hinges 10 of the flip-up electronic product 9 and the turning angle of the respective female hinge members 1 about the respective second hinge shafts 22 can be accurately controlled within a predetermined range to prevent errors in angular difference between the two opposite lateral sides of the cover member 92 and the two opposite lateral sides of the base member 91 and to avoid friction between component parts of the dual-shaft hinges 10. Further, as illustrated in FIG. 9, after rotation of the first hinge shaft 21 through a fixed angle, the female hinge member 1 and the sliding block 3 are turned about the second hinge shaft 22 through a fixed angle. Subject to this interactive activation, the female hinge member 1 will be kept in parallel with the cover member 92 and the base member 91 when the cover member 92 is turned to a parallel position relative to the base member 91, allowing the user to place the flip-up electronic product 9 on a flat surface where the cover member 92 or base member 91 is closely attached to the flat surface. Further, when the cover member 92 is turned to the bottom side of the base member 91, the female hinge member 1 is kept at right angles relative to the cover member 92 and the base member 91, holding the opposing front and rear edges of the cover member 92 respectively in vertical alingment with the respective opposing front and rear edges of the base member 91.

Referring to FIGS. 6-11 and FIG. 1 again, when rotating the first hinge shaft 21, the first rotating member 41 will be rotated with the first hinge shaft 21, and the distance between the first position-limit rod 412 and the second position-limit rod 422 will be relatively increased. When turning the first hinge shaft 21 about the second hinge shaft 22, the distance between the first position-limit rod 412 and the second position-limit rod 422 will be relatively reduced, and a position-limit space 227 will be created in between the second protrusion 35 and the first peripheral wall 224 when the second protrusion 35 is abutted against the second peripheral wall 225, and the first position-limit rod 412 of the linkage 4 will be stopped at the first stop rib 4311. At this time, the biasing force being applied to the first hinge shaft 21 cannot cause the propelling groove 213 of the first hinge shaft 21 to propel the first protrusion 34 due to that the second protrusion 35 is abutted against the second peripheral wall 225, and the first position-limit rod 412 will be stopped by the first stop rib 4311 from moving toward the second position-limit rod 422, and thus, the first hinge shaft 21 will be stopped from rotation. Thereafter, the first hinge shaft 21 drives the female hinge member 1 and the sliding block 3 to turn about the second hinge shaft 22, moving the second protrusion 35 toward the first peripheral wall 224, and the first rotating member 41 is driven by the first hinge shaft 21 to turn about the second hinge shaft 22, causing an increase in the distance between the first position-limit rod 412 and the second position-limit rod 422. When the distance between the first position-limit rod 412 and the second position-limit rod 422 is increased, the first position-limit rod 412 is moved toward the second stop rib 4312 and then stopped at the second stop rib 4312. When the second protrusion 35 is stopped by the first peripheral wall 224, the first position-limit rod 412 is simultaneously stopped at the second stop rib 4312, prohibiting the first hinge shaft 21 from turning the sliding block 3 and the female hinge member 1 about the second hinge shaft 22. Thus, the biasing force being applied to the first hinge shaft 21 will cause the first hinge shaft 21 to rotate, enabling the propelling groove 213 of the first hinge shaft 21 to propel the first protrusion 34 in moving the sliding block 3 toward the second peripheral wall 225 and into abutment against the second peripheral wall 225. At this time, a position-limit space 227 will be created in between the second protrusion 35 and the first peripheral wall 224, and the first hinge shaft 21 will drive the first rotating member 41 to rotate, causing an increase in the distance between the first position-limit rod 412 and the second position-limit rod 422. When the distance between the first position-limit rod 412 and the second position-limit rod 422 is increased, the first position-limit rod 412 will be moved into abutment against the first stop rib 4311.

Repeating the aforesaid action will alternatively cause the first hinge shaft 21 to rotate and the female hinge member 1 to turn with the sliding block 3 about the second hinge shaft 22. Even if an error occurs in the propelling groove 213 or the position-limit groove 223 due to wear, the functioning of the linkage 4 can accurately limit the rotating angle of the first hinge shaft 21 and the turning angle of the female hinge member 1 and the sliding block 3 about the second hinge shaft 22, and thus, the rotating angle of the first hinge shafts 21 of the two dual-shaft hinges 10 of the flip-up electronic product 9 and the turning angle of the respective female hinge members 1 about the respective second hinge shafts 22 can be accurately controlled within a predetermined range to prevent errors in angular difference between the two opposite lateral sides of the cover member 92 and the two opposite lateral sides of the base member 91.

What is claimed is:

1. A dual-shaft hinge usable in a flip-up electronic product, comprising:
   a female hinge member,
   a hinge shaft set, and
   a sliding block,
   wherein said hinge shaft set comprises a first hinge shaft and a second hinge shaft, said first hinge shaft comprising:
      a first shaft body pivotally coupled to said female hinge member,
      a first guide portion located at one end of said first shaft body and disposed outside said female hinge member, and
      a propelling groove spirally extending around a periphery of a portion of said first guide portion, and
   said second hinge shaft comprising:
      a second shaft body pivotally coupled to said female hinge member,
      a second guide portion located at one end of said second shaft body and disposed outside said female hinge member, and
      a position-limit groove spirally extending around a periphery of a portion of said second guide portion,
   wherein said second guide portion defines a first peripheral wall and a second peripheral wall respectively disposed at two opposite lateral sides relative to said position-limit groove, said sliding block being disposed between said first guide portion and said second guide portion of said hinge shaft set, and wherein:
   said sliding block comprises a block body, a first protrusion located at one side thereof and coupled to said propelling groove of said hinge shaft set, and a second protrusion located at an opposite side thereof and coupled to said position-limit groove of said hinge shaft set, a width of said first peripheral wall and a width of said second peripheral wall being larger than a width of said second protrusion so that when said second protrusion abuts against said first peripheral wall, a displacement space is created between said second protrusion and said second peripheral wall, such that when a biasing force is applied to said first hinge shaft, said first hinge shaft is rotated and said propelling groove is forced to propel said first protrusion, thereby causing movement of said sliding block toward said second peripheral wall, and
   when said second protrusion abuts against said second peripheral wall, a position-limit space is created between said second protrusion and said first peripheral wall, such that when a biasing force is applied to said first hinge shaft, said first hinge shaft is prevented from rotating, and said first hinge shaft is forced to turn said sliding block about said second hinge shaft to further cause said second protrusion to be moved toward said first peripheral wall.

2. The dual-shaft hinge as claimed in claim 1, wherein said hinge shaft set further comprises a first locating member, a second locating member, a third locating member and a locating rod, said first locating member and said second locating member being respectively attached to opposing left and right sides of said female hinge member, said third locating member being spaced from one side of said second locating member opposite to said first locating member, said locating rod having two opposite ends thereof respectively connected to said second locating member and said third locating member, said block body of said sliding block comprising a guide hole for the passing of said locating rod.

3. A dual-shaft hinge usable in a flip-up electronic product, comprising:
   a female hinge member,
   a hinge shaft set,
   a sliding block, and
   a linkage, wherein:
   said hinge shaft set comprises a first hinge shaft and a second hinge shaft, said first hinge shaft comprising:
      a first shaft body pivotally coupled to said female hinge member,
      a first guide portion located at one end of said first shaft body and disposed outside said female hinge member, and
      a propelling groove spirally extending around a periphery of a portion of said first guide portion,
   said second hinge shaft comprising:
      a second shaft body pivotally coupled to said female hinge member,
      a second guide portion located at one end of said second shaft body and disposed outside said female hinge member, and
      a position-limit groove spirally extending around a periphery of a portion of said second guide portion, said second guide portion defining a first peripheral wall and a second peripheral wall respectively disposed at two opposite lateral sides relative to said position-limit groove;
   said sliding block is disposed between said first guide portion and said second guide portion of said hinge shaft set, said sliding block comprising a block body, a first protrusion located at one side thereof and coupled to said propelling groove of said hinge shaft set, and a second protrusion located at an opposite side thereof and coupled to said position-limit groove of said hinge shaft set, a width of said second protrusion being smaller than a width of said first peripheral wall and a width of said second peripheral wall;
   said linkage comprises a first rotating member, a second rotating member, and a position-limit member, said first rotating member comprising a first mounting hole fixedly connected to said first shaft body of said hinge shaft set and a first position-limit rod perpendicularly extending from one side thereof, said second rotating member comprising a second mounting hole fixedly connected to said second shaft body of said hinge shaft set and a second position-limit rod perpendicularly extending from one side thereof, said position-limit member comprising a first position-limit hole coupled with said first position-limit rod, a second position-limit hole coupled with said second position-limit rod, a first stop rib_located in said first position-limit hole and disposed relatively close to said second position-limit hole and a second stop rib located in said first position-limit hole and disposed relatively far from said second position-limit hole, a distance between said first stop rib and said second stop rib being larger than an outer diameter of said first position-limit rod;
   wherein when said second protrusion abuts against said first peripheral wall, a displacement space is created in-between said second protrusion and said second peripheral wall, and said first position-limit rod of said linkage abuts against said second stop rib, and when a biasing force is applied to said first hinge shaft, said first hinge shaft is rotated and said first guide portion is forced to move said first protrusion, thereby causing movement of said sliding block toward said second peripheral wall, and at the same time, said first rotating member is rotated with said first hinge shaft to shorten a distance between said first position-limit rod and said second position-limit rod and to allow said first position-limit rod to move toward said first stop rib; and wherein when said second protrusion abuts against said second peripheral wall, a position-limit space is created between said second protrusion and said first peripheral wall, and said first position-limit rod of said linkage is forced to abut against said first stop rib so that when when a biasing force is applied to said first hinge shaft, said first hinge shaft is prevented from rotating, and said first hinge shaft is forced to turn said sliding block about said second hinge shaft to further cause said second protrusion to be moved toward said first peripheral wall, and said first rotating member is forced by said first hinge shaft to turn about said second hinge shaft, and the distance between said first position-limit rod and said second position-limit rod is increased, such that said first position-limit rod is forced to move toward said second stop rib.

4. The dual-shaft hinge as claimed in claim 3, wherein said hinge shaft set further comprises a first locating member, a second locating member, a third locating member and a locating rod, said first locating member and said second locating member being respectively attached to opposing left and right sides of said female hinge member, said third locating member being spaced from one side of said second locating member opposite to said first locating member, said locating rod having two opposite ends thereof respectively connected to said second locating member and said third locating member, said block body of said sliding block comprising a guide hole for the passing of said locating rod.

* * * * *